United States Patent
Nowlan et al.

[11] Patent Number: 5,920,647
[45] Date of Patent: Jul. 6, 1999

[54] METHOD AND APPARATUS FOR RECOGNITION OF HAND-PRINTED CHARACTERS REPRESENTED AS AN ELECTRONIC INK STREAM USING A BOX FILTERING TECHNIQUE

[75] Inventors: Steven J. Nowlan, San Jose; Jerry Panagrossi, Sunnyvale; Mark A. Monheit, Menlo Park; Pierre Demartines, San Francisco, all of Calif.

[73] Assignee: Motorola, Inc., Schaumburg, Ill.

[21] Appl. No.: 08/909,500

[22] Filed: Aug. 12, 1997

[51] Int. Cl.[6] .............................. G06K 9/00; G06K 9/46; G06K 9/66; G06K 9/48
[52] U.S. Cl. ..................... 382/187; 382/190; 382/198; 382/202; 382/226
[58] Field of Search ...................... 382/187, 189, 382/191, 202, 190, 192, 194, 198, 226; 345/173, 179

[56] References Cited

U.S. PATENT DOCUMENTS

| | | | |
|---|---|---|---|
| 4,365,235 | 12/1982 | Greanias et al. | 382/189 |
| 4,375,081 | 2/1983 | Blesser | 364/724 |
| 4,653,107 | 3/1987 | Shojima et al. | 382/189 |
| 4,953,226 | 8/1990 | Matsuyama | 382/189 |
| 5,001,765 | 3/1991 | Jeanty | 382/187 |
| 5,023,918 | 6/1991 | Lipscomb | 382/31 |
| 5,313,528 | 5/1994 | Nishida | 382/187 |
| 5,392,363 | 2/1995 | Fujisaki et al. | 382/187 |
| 5,526,023 | 6/1996 | Sugimoto et al. | 382/187 |
| 5,549,261 | 8/1996 | Bellegarda et al. | 382/187 |
| 5,550,931 | 8/1996 | Bellegarda et al. | 382/187 |
| 5,559,897 | 9/1996 | Brown et al. | 382/187 |
| 5,588,073 | 12/1996 | Lee et al. | 382/187 |

*Primary Examiner*—Bipin H. Shalwala
*Attorney, Agent, or Firm*—Terri S. Hughes

[57] ABSTRACT

A method and apparatus to recognize hand-printed characters represented as an electronic ink stream. A first filtering box (300) is defined around a center of a first output point (324) in the electronic ink stream and the first output point is added to a filtered ink stream. A second output point (328) is added to the filtered ink stream only when the electronic ink stream moves outside the filtering box (300). When the second output point (328) is added, the filtering box is re-centered on the second output point (328) only in a dimension that is exceeded after adding the second output point (328) to the filtered ink stream to create a second filtering box (310). Moreover, extraction points (630, 640, 650 and 660) are provided approximately equally spaced across a finite set of points of electronic ink to create a compact representation of a finite set of points of electronic ink.

12 Claims, 3 Drawing Sheets

METHOD AND APPARATUS FOR RECOGNITION OF HAND-PRINTED CHARACTERS REPRESENTED AS AN ELECTRONIC INK STREAM USING A BOX FILTERING TECHNIQUE

FIELD OF THE INVENTION

This invention relates generally to the recognition of hand-printed characters represented as an electronic ink stream.

BACKGROUND OF THE INVENTION

Recently, there has been an explosion in the market for very small consumer devices which are highly portable, pocketable or even wearable. Entering textual information into these devices, however, is a challenge. Because of their small size, many of these devices cannot support a full keyboard. Moreover, mechanisms which cycle through letter choices can be very slow and difficult to work with, especially for longer messages.

A natural way to enter information into such a small device is by using an electronic digitizer and some form of handwriting recognition. A large number of different mechanisms for recognizing handwritten input on an electronic digitizer have been proposed, but most of these mechanisms require large amounts of memory and processing power (similar to the amounts of memory and processing power found on desktop computing systems). Such handwriting recognition mechanisms are ill-suited for small portable devices.

More recently, several handwriting input mechanisms specifically aimed at very small electronic devices with limited memory and processing power have been proposed. However, these systems require the user to memorize a particular alphabet (generally an alphabet of uni-stroke characters) which is different from the user's natural handwriting style.

Hence, there exists a need for a small electronic device that provides a handwriting input system which meets the processing and memory requirements and which allows a user to write in his natural handwriting style.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

The preferred embodiment of the present invention is an on-line handwriting recognition software designed to recognize hand-printed characters from any Latin-character alphabet. The algorithm used in the preferred embodiment of the present invention is designed to work with pre-segmented characters and contains no segmentation algorithm. The preferred embodiment of the present invention provides a handwriting input system which meets the processing and memory requirements similar to the smallest and fastest uni-stroke recognizers, and which still gives the user the flexibility to write in his own natural handwriting style, with varying numbers of strokes for different characters.

Figure 1:
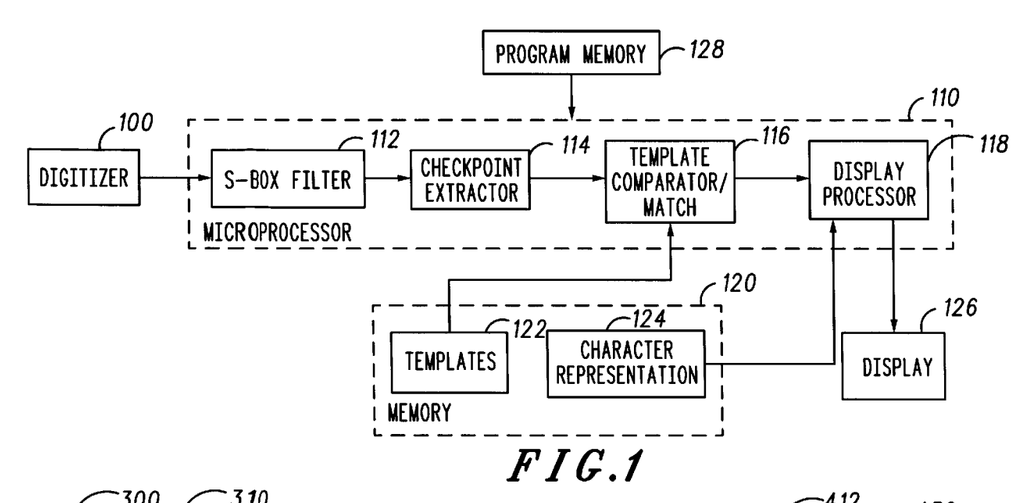
FIG. 1 is a block diagram of an overview of an apparatus according to the preferred embodiment of the present invention.

Referring to the drawings, FIG. 1 is a block diagram of an overview of an apparatus according to the preferred embodiment of the present invention. The apparatus comprises a digitizer 100, a general purpose microprocessor 110, a memory 120 and a display 126. The microprocessor 110 further comprises a S-box filter 112, a checkpoint extractor 114, a template comparator/ match 116 and a display processor 118. The memory 120 further comprises templates 122 and character representations 124.

The digitizer 100 is coupled to the S-box filter 112 of the microprocessor 110. The S-box filter 112 is coupled to the checkpoint extractor 114. The checkpoint extractor 114 is coupled to the template comparator/match 116. The template comparator/ match 116 is coupled to the display processor 118. The display processor 118 is coupled to the display 126. The templates 122 of the memory 120 is coupled to the template comparator/ match 116 of the microprocessor 110. The character representations 124 of the memory 120 is coupled to the display processor 118 of the microprocessor 110.

Also shown in FIG. 1 is a data storage medium in the form of a program memory 128. The program memory 128 (optionally) stores instructions and data which, when loaded into the microprocessor 110, cause the microprocessor 110 to comprise the S-box filter 112, the checkpoint extractor 114, the template comparator/match 116 and the display processor 118.

In operation, the preferred embodiment of the present invention receives digital ink as a series of (x,y) coordinates collected at evenly-spaced time intervals (e.g., every 100 ms). Several procedures are used to preprocess the raw ink data into a form that allows robust recognition.

In the first stage of preprocessing, duplicate adjacent ink points are removed and the number of strokes and a bounding box of the ink are computed. A stroke is defined as all ink between when the stylus comes into contact with the tablet and when the stylus is lifted. A character has multiple strokes if the stylus is lifted at least once between the beginning and the end of the character.

The ink coordinates are translated so that the lower left corner of the bounding box is brought into registration with the origin of a 128×128 grid. Bringing the lower left corner of a character into registration is particularly effective because characters aligned in this way tend to show the most consistency both within and between characters.

Ink coordinates are then scaled equally in the horizontal and vertical dimensions so that the larger of the two dimensions just fills the 0–127 range of the grid. After scaling, three ink points are linearly interpolated between each pair of electronic ink points. The result is ink which is oversampled by a factor of four. This ink is used by all subsequent processing stages.

Figure 2:
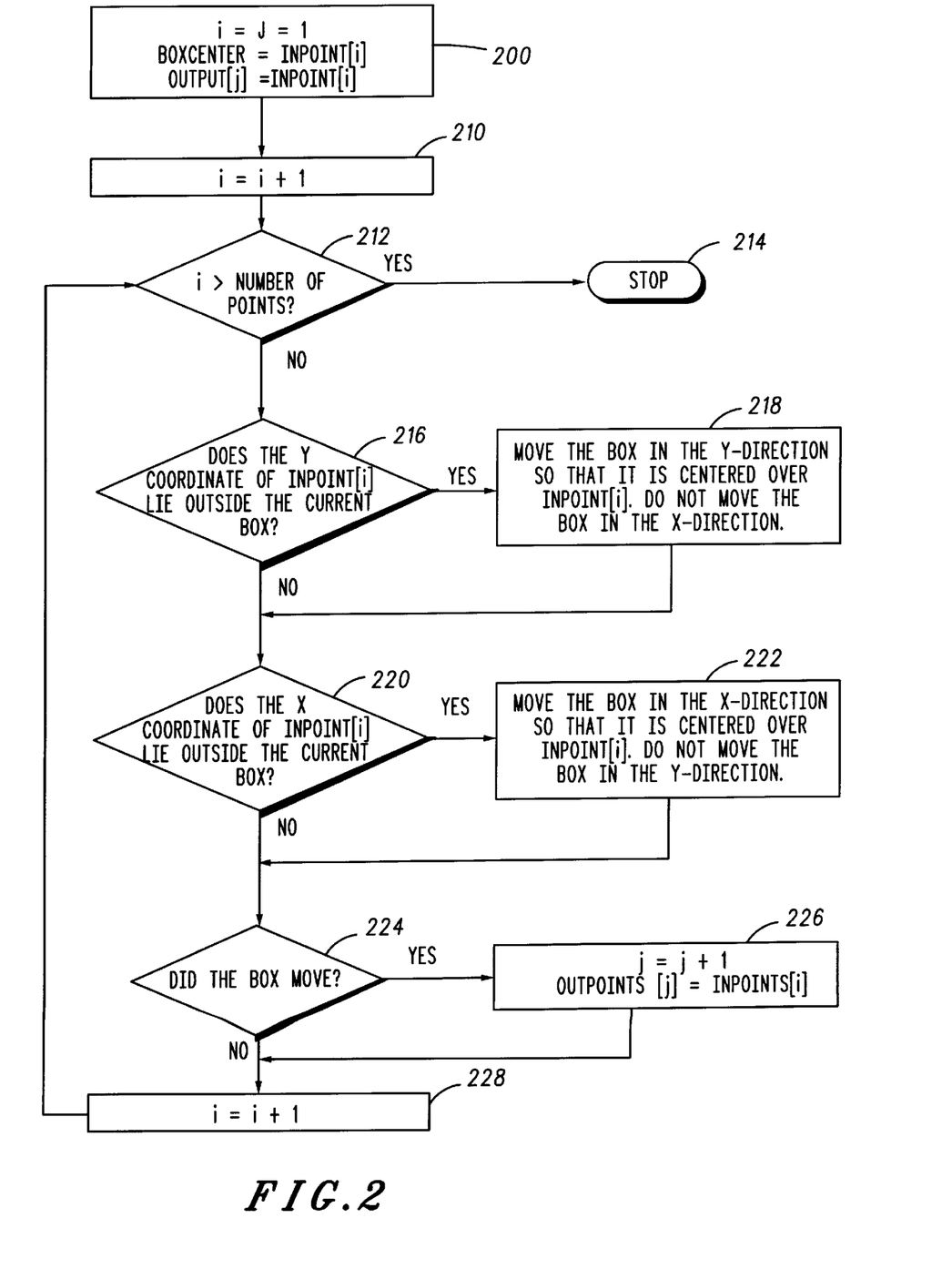
FIG. 2 is a flow chart of a S-box filter according to the preferred embodiment of the present invention.

FIG. 2 is a flow chart of the S-box filter 112 according to the preferred embodiment of the present invention. The S-box filter 112 later provides parts of a.a recognition algorithm using ink with many artifacts removed, where the artifacts arise due to poor digitizers and a hostile mobile environment. The S-box filter 112 allows the recognizer to operate on small portable devices with inexpensive digitizers in almost any environment, including a moving car, bus, train, etc.

The S-box filter 112 attempts to preserve both the spatial and temporal structure of the electronic ink stream while removing both noise and artifacts. The filtering algorithm according to the preferred embodiment of the present invention works by defining a filtering box centered on the first point in the electronic ink stream. The filtering box can take on a variety of forms (e.g., the height and width of the filtering box can be equal, the sides of the filtering box can be equal length, the dimensions of the filtering box can be orthogonal, etc.). A point is added to a filtered ink stream only when the stylus moves outside the filtering box. When a new point is added, the filtering box is re-centered on the new point, in only a first dimension when point lies beyond the filtering box in the first dimension but re-centering the filtering box on the new point in only a second dimension when the new point lies beyond the filtering box in the second dimension. The algorithm is defined by the following segment of pseudo-code (which corresponds to steps 200–228 of the flow chart of FIG. 2):

Let kBoxHalfWidth be one half of the width of the filtering box.

Let kBoxHalfHeight be one half of the height of the filtering box.

Let pInk be a pointer to the first element of an array of (x,y) pairs representing the input ink.

Let NumPts be the number of (x,y) points in the input ink.

Let pNewPts be a pointer to the first element of an array of (x,y) pairs representing the filtered ink.

Let NumNew be the number of (x,y) points in the filtered ink.

```
boxMoved = FALSE;                              (step 200)
boxTop = pInk -> Y + kBoxHalfHeight;           (step 200)
boxBottom = pInk -> y - kBoxHalfHeight;        (step 200)
boxRight = pInk -> + kBoxHalfwidth;            (step 200)
boxLeft = pInk -> x - kBoxHalfwidth;           (step 200)
pNewPt -> x = pInk -> x;                       (step 200)
pNewPt -> y = pInk -> y;                       (step 200)
pInk = pInk + 1;                               (step 210)
pNewPt = pNewPt + 1;                           (step 210)
numNew = 1;                                    (step 210)
NumPts = NumPts - 1;                           (step 210)
while (NumPts > 0) {                           (step 212)
   boxMoved = FALSE;
   if (pInk -> y > boxTop || pInk -> y <
   boxBottom) {                                (step 216)
      boxMoved = TRUE;                         (step 218)
      boxTop = pInk -> y + kBoxHalfHeight;     (step 218)
      boxBottom = pInk -> y - kBoxHalfHeight;  (step 218)
   }
   if (pInk -> x > boxRight || pInk -> x <
   boxLeft) {                                  (step 220)
      boxMoved = TRUE;                         (step 222)
      boxRight = pInk -> x + kBoxHalfwidth;    (step 222)
      boxLeft = pInk -> x - kBoxHalfWidth;     (step 222)
   }
   if (boxMoved) {                             (step 224)
```

-continued

```
      pNewPt -> x = pInk -> x;                 (step 226)
      pNewPt -> y = pInk -> y;                 (step 226)
      pNewPt = pNewPt + 1;                     (step 226)
      numNew = numNew + 1;                     (step 226)
   }
   pInk = pInk + 1;                            (step 228)
   NumPts = NumPts - 1;                        (step 228)
}
```

The tests check to see if either the x-coordinate or the y-coordinate of the next point to consider in the electronic ink stream lies outside of the current filtering box. If either coordinate is outside the filtering box, the new point is added to the filtered ink stream and the filtering box is re-centered on the new point, but only in the dimension of the coordinate that was exceeded.

The S-box filter 112 simultaneously accomplishes three different objectives: smoothing and hesitation removal, re-sampling uniformly in space and preservation of both spatial and temporal structures of the electronic ink stream.

A hesitation is a sudden sharp change in direction (in many cases a full reversal) which occurs normally when a writer pauses during the writing of a character. Accidental hesitations can be generated in regions of sharp curvature changes, especially when writing on a slippery surface or when a poor digitizer is used. The presence of hesitations can generate spurious features which can severely degrade the recognition performance of the electronic ink stream. The preferred embodiment of the present invention removes hesitations and other types of small order direction changes from the electronic ink stream. The S-box filter 112 does not report sudden direction changes unless they are large enough to cause the stylus to leave the current filtering box. If the stylus continues to move in a consistent direction, the points are re-sampled resulting in not all of the points being reported. Instead, a point is reported only if it has covered a certain minimal distance. This allows points to be spaced at a uniform distance when the stylus is moving in a consistent direction.

Thus, when the stylus is moving in a consistent direction, the S-box filter 112 performs a re-sampling algorithm which results in points spaced at a uniform distance along the trajectory of the stylus. Having points which are spaced uniformly in distance is useful for calculating many input features of interest in classifying written characters.

Finally, it is noted that when the stylus is moving fairly quickly, every point reported by the stylus will be outside the current filtering box. In this regime, all points are reported as they are collected and none are filtered. This means that for rapid motions, the filter preserves both spatial and temporal structures in the electronic ink stream allowing speed and acceleration features to be calculated in regions of rapid motion.

Figure 3:
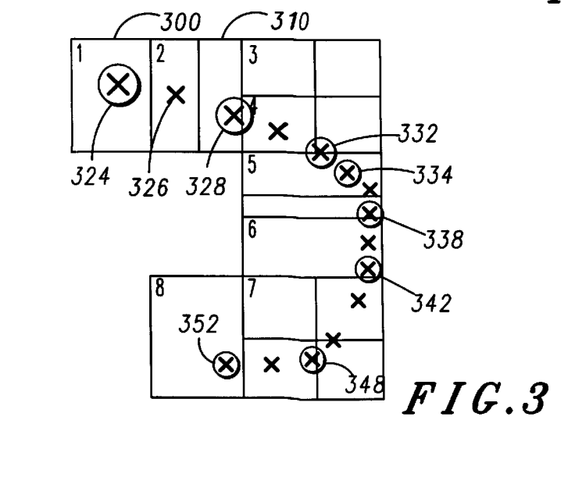
FIG. 3 is a first example of the operation of the S-box filter of FIG. 2 according to the preferred embodiment of the present invention.

FIG. 3 is a first example of the operation of the S-box filter 112 of FIG. 2 according to the preferred embodiment of the present invention. FIG. 3 illustrates the S-box filter 112 operating on a fairly clean piece of curved ink which contains no hesitations. The "X"s represent the electronic sampled points which are presented to the filter. The circled "X"s 324, 328, 332, 334, 338, 342, 348 and 352 indicate the points which are output points of the filter and represent the result of processing the ink of the filter. The first circled point 324 is the first electronic sample point and is automatically an output point of the filter.

Filtering box 300 is centered around this first output point 324. The second input point 326 is located within filtering box 300 and thus is not considered an output point of the filter. Point 328 is located outside filtering box 300. As a result, point 328 becomes the second output point of the filter. Output point 328 is located outside filtering box 300 in the x-dimension, but not outside filtering box 300 in the y-dimension. Thus, only the x-dimension of filtering box 300 is changed and a new filtering box 310 is created to indicate the change of filtering box 300 in the x-dimension. This process continues until the electronic ink stream has been filtered in its entirety and all of the filter output points have been identified (i.e., all of the circled "X"s have been identified).

In this example, output points 324, 328 and 332 all involve only horizontal (x-dimension) motions of the respective filtering box. Output points 334, 338 and 342 all involve only vertical (y-dimension) motions of the respective filtering box. Output points 348 and 352 again involve horizontal motions of the respective filtering box. Note that when the respective filtering box transitions from a horizontal to a vertical motion, or vice versa, the filter can output two points much closer to each other than is typical, as seen between output points 332 and 334.

Figure 4:
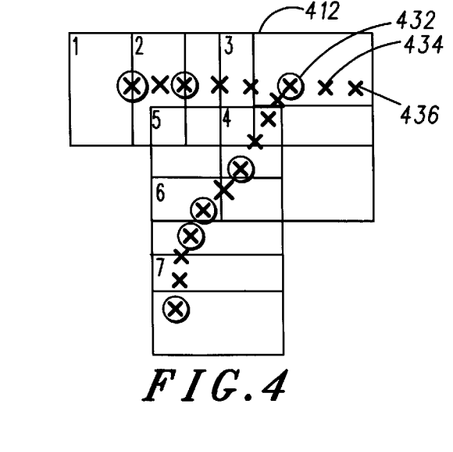
FIG. 4 is a second example of the operation of the S-box filter of FIG. 2 according to the preferred embodiment of the present invention.

FIG. 4 is a second example of the operation of the S-box filter 112 of FIG. 2 according to the preferred embodiment of the present invention. FIG. 4 illustrates the S-box filter 112 operating on a set of electronic ink samples. Once again the "X"s represent the electronic sampled input points and the circled "X"s represent output points of the filter. FIG. 4 illustrates an example of a hesitation and illustrates how the S-box filter 112 removes the hesitation. The two input points 434 and 436 to the right of output point 432 are examples of an overshoot hesitation during writing of the first horizontal stroke. Note how these input points 434 and 436 are located within filtering box 412 and thus are not output points of the filter. The set of output points reflects the shape of the number seven (7) without any excess features caused by the overshoot hesitation.

Figure 5:
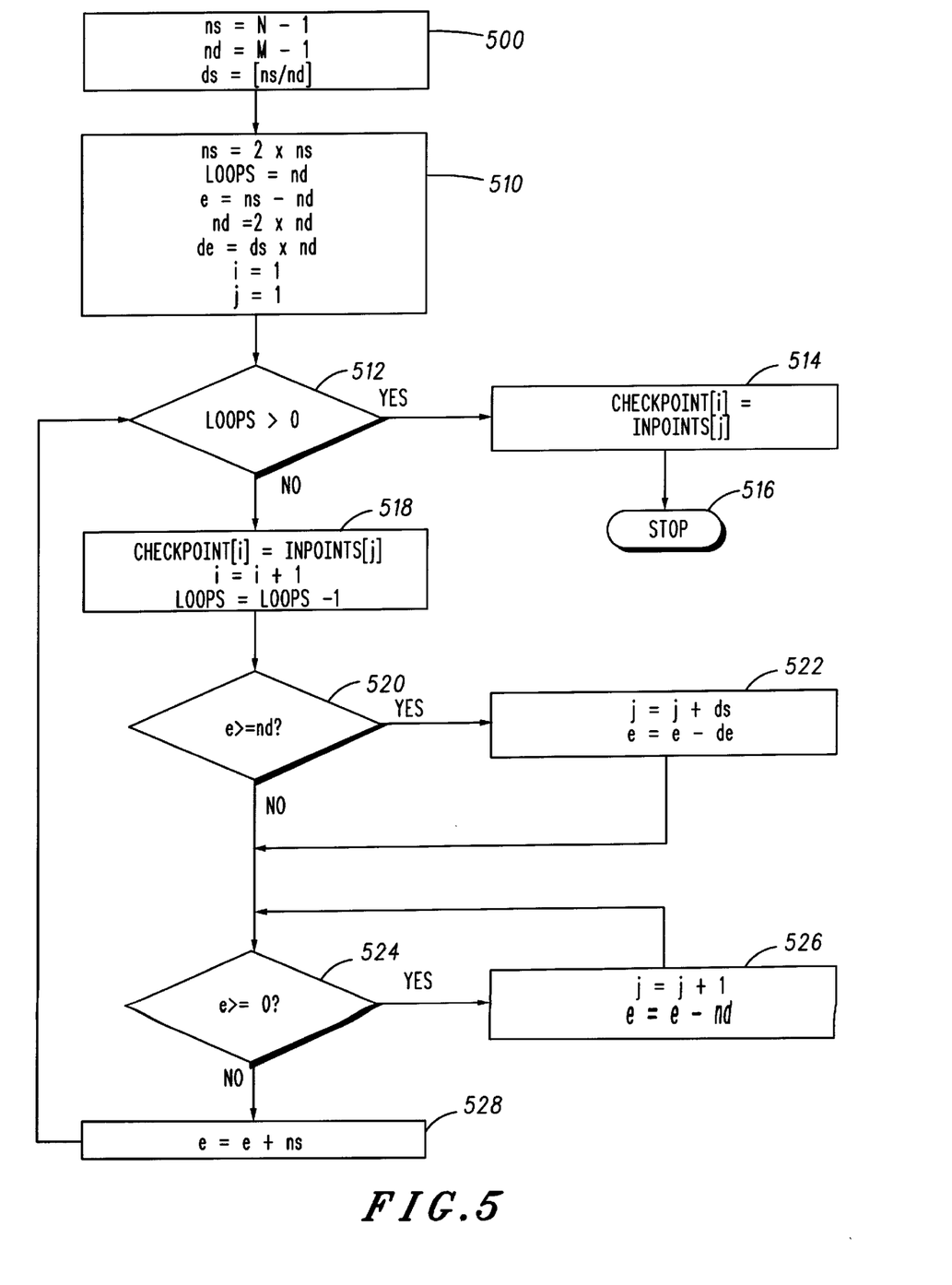
FIG. 5 is a flow chart of a checkpoint extraction process according to the preferred embodiment of the present invention.

FIG. 5 is a flow chart of a checkpoint extraction process according to the preferred embodiment of the present invention. After the ink has been filtered, a 2M+1 element feature vector is extracted, where M is the number of checkpoint features as defined below. The feature extraction algorithm is as follows (which corresponds to steps 500 through 528 of the flow chart of FIG. 5):

Let N be the total number of points in the filtered ink. Divide N into M−1 segments as evenly as possible. This will yield a set of M index points I={i1, i2, ... ,iM} where i1 is always the index of the first point in the ink and iM is always the last point.

Starting with the first point in the ink (i1), use the x- and y-coordinates of the ink point as the first two features in the feature vector. Advance to the i2'th point in the filtered ink. Add the x- and y-coordinates of this point to the feature vector, repeating until the last indexed ink point has been added to the vector. Set the last feature to the number of strokes in the ink (computed at the first preprocessing stage).

The resulting feature vector, V=[x1,y1, ... , xM,yM,s], has 2M+1 elements, the first 2M of which are equally spaced filtered ink coordinates, which are checkpoints. The last feature is simply the number of strokes in the ink.

This feature representation has several interesting properties. First, the computation to extract the checkpoints from the filtered ink is extremely fast. The checkpoint locations can be chosen in a small fixed computation time, independent of the number of points in the ink. This computation time depends on the number of checkpoints, but is fixed once the number of checkpoints to be used in the representation has been fixed. Second, the coordinates of filtered ink points are used directly in the feature vector. No computation is required to infer some higher-level feature. Third, the dimension of the feature vector is constant across characters, writing styles and number of strokes. This allows for extremely efficient storage and matching of feature vectors, as well as allowing the application of a wide variety of algorithms in training the system. Finally, the feature vector is compact (requiring only 2M+1 bytes of storage).

For the Latin lowercase character alphabet, it has been found that M=8 checkpoints provides an optimal trade-off between classification performance and compactness of the representation. However, different numbers of checkpoints may be appropriate for other character sets.

The feature extraction process outlined above requires that a set of M points spanning the interval [1, ... , N] divides the interval into M−1 segments as evenly as possible. A variant of the Bresenham algorithm is used to accomplish this task. The variant of the Bresenham algorithm used in the preferred embodiment of the present invention computes M index points, which are as evenly spaced as possible, in the interval [1, ... , N] and include both 1 and N. The variant used in the preferred embodiment of the present invention always takes time proportional to the number of index points M, and thus a fixed M can be computed in constant time regardless of the size of N.

The following pseudo-code defines the variant of the Bresenham algorithm used in the preferred embodiment of the present invention for extracting the checkpoint features from the filtered ink:

Let N be the number of points in the filtered ink.
Let M be the desired number of index points.
Let pInk be a pointer to the first element of an array of (x,y) pairs representing the filtered ink; checkpoints be a pointer to the first element the array of (x,y) pairs representing the checkpoint features in the feature vector.

| | |
|---|---|
| ns = N; | (step 500) |
| nd = M; | (step 500) |
| nd−−; | (step 500) |
| ns−−; | (step 500) |
| ds = floor (ns/nd); | (step 500) |
| ns *= 2; | (step 510) |
| loops = nd; | (step 510) |
| e = ns − nd; | (step 510) |
| nd *= 2; | (step 510) |
| de = ds*nd; | (step 510) |
| while (loops−−) { | (step 512) |
|   pCheakPoints -> x = pInk -> x; | (step 518) |
|   pCheckPoints -> y = pInk -> y; | (step 518) |
|   pCheckPoints ++; | (step 518) |
|   if (e >= nd) { | (step 520) |
|     pInk += ds; | (step 522) |
|     e −= de; | (step 522) |
|   } | |
|   while (e >= 0) { | (step 524) |
|     pInk++; | (step 526) |
|     e −= nd; | (step 526) |
|   } | |
|   e += ns; | (step 528) |
|   pCheckPoints -> x = pInk -> x; | (step 528) |
|   pCheckPoints -> y = pInk -> y; | (step 528) |
| } | |

Note that all variables in the above pseudo-code are integers and all operations are integer operations. In particular, floor (ns/nd) is the greatest integer less than or equal to ns divided by nd.

Figure 6:
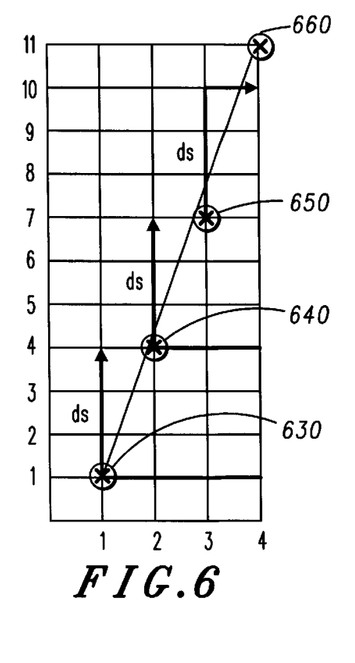
FIG. 6 graphically illustrates a re-sampling algorithm used as part of the checkpoint extraction process of FIG. 5 according to the preferred embodiment of the present invention.

FIG. 6 graphically illustrates a re-sampling algorithm used as part of the checkpoint extraction process of FIG. 5 according to the preferred embodiment of the present invention. FIG. 6 illustrates a method for creating a compact representation of a finite set of points of electronic ink. This re-sampling algorithm provides extraction points approximately equally spaced across the finite set of points of electronic ink. The re-sampling algorithm also provides for a number of computational operations proportional to the number of extracted points, regardless of how many points are in the finite set of points of electronic ink. Moreover, the re-sampling algorithm extracts a fixed number of checkpoints from the finite set of points of electronic ink even when the finite set of points of electronic ink contains fewer than the fixed number of checkpoints.

For purposes of this example, the input contains eleven (x,y) coordinates displayed along the y-axis and the output contains only four of those coordinates displayed along the x-axis. The extraction points labeled 630, 640, 650 and 660 are the (x,y) pairs chosen as checkpoints and in this case correspond to the first, fourth, seventh and eleventh input points. The diagonal line joining extraction points 630 and 660 is a theoretical optimal sampling line. The re-sampling algorithm tries to place its sampling points as close to the theoretically optimal sampling line as possible. The re-sampling algorithm does this by first taking a step of size ds vertically, as indicated by the vertical arrows, and a step of size one horizontally. The re-sampling algorithm compares the distance to the theoretical optimal sampling line. If the distance is less than one, that point is added to the output. If the distance is greater than or equal to one, an additional step is taken vertically and the re-sampling algorithm will re-test the distance from the theoretical optimal sampling line. In this example, extraction point 630 is automatically added to the output because it is the first input point in the ink stream. Since the distance from the theoretical optimal sampling line is less than one after the step of size ds between extraction points 630 and 640 and between extraction points 640 and 650, extraction points 640 and 650 are also added to the output. However, since the distance is greater than or equal to one at coordinates (3,10), the point corresponding to coordinates (3,10) is rejected and extraction point 660 is instead added to the output.

While the present invention has been described in conjunction with a specific embodiment thereof, it is evident that many alterations, modifications and variations will be apparent to those skilled in the art in light of the foregoing description. Thus, it should be understood that the present invention is not limited by the foregoing description, but embraces all such alterations, modifications and variations in accordance with the spirit and scope of the appended claims.

We claim:

1. A method for recognition of hand-painted characters represented as an electronic ink stream using a box filtering technique having at least two points, comprising the step of:
    defining a filtering box centered on a first point in the electronic ink stream;
    adding the first point to a filtered ink stream;
    adding a new point to the filtered ink stream only when a next point of the electronic ink stream lies outside of the filtering box; and
    when the new point is added, re-centering the filtering box on the new point in a first dimension only when the new point lies beyond the filtering box in the first dimension but re-centering the filtering box on the new point in a second dimension only when thenew point lies beyond the filtering box in the second dimension.

2. The method of claim 1 further comprising the step of providing, at an output, a pair of coordinates identifying the new point.

3. The method of claim 1 further comprising the step of re-sampling the at least two points when the electronic ink stream is moving in a consistent direction.

4. The method of claim 1 wherein the filtering box has equal height and width.

5. The method of claim 1 wherein the filtering box has sides of equal length.

6. The method of claim 1 wherein the filtering box has orthogonal dimensions.

7. A method for creating a compact representation of a finite set of points of electronic ink comprising:
    filtering a set of electronic ink data points using a filtering technique to provide a first set having a number of filtered data points;
    providing a second set having a number of extraction points approximately equally spaced across the first set of filtered data points, wherein the second set of extraction points has fewer data points than the first set of filtered data points, and wherein the step of providing the second set of extraction points comprises:
    determining how many data points are In the first set of filtered data points; and
    extracting the second set of extraction points along the first set of filtered data points dependent on a desired ratio of the number of filtered data points in the first set to the number of extraction points in the second set.

8. The method of claim 7 wherein the first set of filtered data points encompasses plurality of pen-up and pen-down segments.

9. An apparatus for recognition of hand-printed characters as an electronic ink stream using a box filtering technique comprising
    a digitizer.
    a microprocessor, coupled to the digitizer, having a box filter, a checkpoint extractor, a template comparator and a display processor, wherein the box filter defines a filtering box centered on a first point in the electronic ink stream, adds the first point to a filtered ink stream, adds a new point to the filtered ink stream only when a next point of the electronic stream lies outside of the filtering box, and when the new point is added, re-centering the filtering box on the new point in a selected dimension only, wherein the selected dimension is an x-dimension when the new point lies outside filtering box in the x-dimension but is a y-dimension when the new point lies outside the filtering box in the y-dimension;
    a memory, coupled to the microprocessor, having a template and a character representation; and
    a display coupled to the microprocessor.

10. A date medium comprising instruction and data which, when load into a microprocessor cause the microprocessor to comprise a filter, a checkpoint extractor, a template comparator and a display processor, wherein the box filter defines a filtering box centered on a first point in the electronic ink stream, adds the first point to a filtered ink stream, adds a new point the filtered ink stream only when a next point of electronic ink stream lies outside of the filtering box, and when the new point is added, re-centers the filtering box on the new point in only first dimension, when the new point lies beyond the filtering box in the first dimension but re-centers filtering box an the new point in only a second dimension, when the new point lies beyond the filtering box in the second dimension.

11. An apparatus for recognition of hand-printed characters as an electronic Ink stream comprising:

a digitizer;

a microprocessor, coupled to the digitizer, having a box filter and a check point extractor, wherein the box filter filters a set of electronic ink data points to provide a first set of filtered data points, and the check point extractor provides a second set of extraction points approximately equally spaced across the first set of filtered data points by determining how many data points are in the first set of filtered data points and extracting the second set of extraction points along the first set of filtered data points dependent on a desired ratio of the number of filtered date points in the first set to the number of extraction points in the second set such that the second set of extraction points has fewer data points than the first set of filtered data points.

12. A data storage medium comprising instructions and data which, when loaded into a microprocessor cause the microprocessor to comprise a box filter and a checkpoint extractor, wherein the box filter filters a set of electronic ink data points to provide a first set of filtered data points, and the checkpoint extractor provides a second set of extraction points approximately equally spaced across the first set of filtered data points by determining how many data points are in the first set of filtered data points and extracting the second set of extraction points along the first set of filtered data points dependent on a desired ratio of the number of filtered data points in the first set to the number of extraction points in the second set such that the second set of extraction points has fewer data points than the first set F filtered points.

* * * * *

UNITED STATES PATENT AND TRADEMARK OFFICE
CERTIFICATE OF CORRECTION

PATENT NO. : 5,920,647
DATED : July 6, 1999
INVENTOR(S) : Steven J. Nowlan, Jerry Panagrossi, Mark A. Monheit, Pierre Demartines It is certified that error appears in the above-indentified patent and that said Letters Patent is hereby corrected as shown below:

Column 7, Line 52 delete "step" and insert --steps-- therefor

Column 7, Line 63 delete "thenew" and insert --the new-- therefor

Column 8, Line 21 delete "In" and insert --in-- therefor

Column 8, Line 33 delete "a digitizer." and insert --a digitizer;-- therefor

Column 8, Line 44 delete "lies outside" and insert --lies outside the-- therefor Column 8, Line 51 delete "date medium" and insert --data storage medium-- therefor Column 8, Line 53 delete "a filter," and insert --a box filter,-- therefor Column 8, Line 57 delete "point the filtered" and insert --point to the filtered-- therefor Column 8, Line 58 delete "point of electronic ink" and insert --point of the electronic ink-- therefor Column 8, Line 62 delete "re-centers filtering box an" and insert --re-centers the filtering box on-- therefor Column 8, Line 66 delete "electronic Ink" and insert --electronic ink-- therefor Column 9, Line 13 delete "date points" and insert --data points-- therefor

UNITED STATES PATENT AND TRADEMARK OFFICE
CERTIFICATE OF CORRECTION

PATENT NO. : 5,920,647
DATED : July 6, 1999
INVENTOR(S) : Steven J. Nowlan, et. al.

It is certified that error appears in the above-identified patent and that said Letters Patent is hereby corrected as shown below:

Column 10, Line 14 delete "first set F filtered" and insert --first set of filtered --therefore.

Signed and Sealed this

Eighth Day of February, 2000

*Attest:*

Q. TODD DICKINSON

*Attesting Officer*     *Commissioner of Patents and Trademarks*